US012533824B2

(12) United States Patent
Candler et al.

(10) Patent No.: US 12,533,824 B2
(45) Date of Patent: Jan. 27, 2026

(54) MANDOLINE CUTTING APPARATUS

(71) Applicant: Conair LLC, Stamford, CT (US)

(72) Inventors: Robert F. Candler, Shelton, CT (US); Thomas E. Wilkes, New Canaan, CT (US)

(73) Assignee: CONAIR LLC, Stamford, CT (US)

( * ) Notice: Subject to any disclaimer, the term of this patent is extended or adjusted under 35 U.S.C. 154(b) by 109 days.

(21) Appl. No.: 18/615,213

(22) Filed: Mar. 25, 2024

(65) Prior Publication Data

US 2025/0296262 A1 Sep. 25, 2025

(51) Int. Cl.
*B26D 3/28* (2006.01)
*B26D 7/00* (2006.01)
*B26D 7/06* (2006.01)

(52) U.S. Cl.
CPC ........... *B26D 3/283* (2013.01); *B26D 7/0641* (2013.01); *B26D 2003/288* (2013.01); *B26D 2007/0018* (2013.01); *B26D 2210/02* (2013.01)

(58) Field of Classification Search
CPC .............. B26D 3/283; B26D 2003/285; B26D 2003/286; B26D 2003/287; B26D 2003/288; B26D 7/0641; B26D 2210/02; B26D 7/225; B26D 1/06
See application file for complete search history.

(56) References Cited

U.S. PATENT DOCUMENTS 10,974,411 B2 4/2021 Jin
11,433,564 B1 9/2022 Chen
2004/0200366 A1* 10/2004 Koerselman ........... B26D 3/283 99/537
2010/0199823 A1* 8/2010 Dalla Piazza .......... B26D 3/283 83/437.2
2020/0047368 A1 2/2020 Jin
2020/0070377 A1 3/2020 Jaureguibeitia Olalde
2023/0080615 A1 3/2023 Kent et al.
2024/0293947 A1* 9/2024 Korn ...................... B26D 3/283
2024/0316816 A1* 9/2024 Lu ............................ B26D 7/24

FOREIGN PATENT DOCUMENTS

CN 108453800 A * 8/2018 ............. B26D 5/083
CN 210256263 4/2020
CN 114147776 A 3/2022
CN 114161497 A 3/2022
WO WO-2012120493 A2 * 9/2012 ........... B26D 7/0608

OTHER PUBLICATIONS

English language translation of CN 108453800 A to Hu obtained from https://worldwide.espacenet.com/ on Sep. 9, 2025.*
International Search Report & Written Opinion dated Apr. 8, 2025 from corresponding International Application No. PCT/US2025/016561.

* cited by examiner

*Primary Examiner* — Evan H Macfarlane
(74) *Attorney, Agent, or Firm* — Grogan, Tuccillo & Vanderleeden, LLP

(57) ABSTRACT

A mandoline cutting apparatus includes a frame, a carriage assembly having a slicing blade, the carriage assembly being slidably moveable relative to the frame to slice a food item with the slicing blade, a food chute pivotally connected to the frame and moveable between a closed position and an open position, and a locking mechanism for locking the food chute in a closed position.

13 Claims, 18 Drawing Sheets

MANDOLINE CUTTING APPARATUS

FIELD OF THE INVENTION

The present invention relates generally to food preparation devices and, more particularly, to an upright mandoline cutting apparatus having a variety of safety features.

BACKGROUND OF THE INVENTION

Manual mandoline slicing devices are popular tools for quickly slicing vegetables and other food items into evenly cut slices. Typically, such devices include a slicing blade mounted within a frame, along which a food item may be moved to cut the food item into slices. Existing devices may also allow for julienne slicing or cubing utilizing an array of vertical blades positioned adjacent to the slicing blade.

While these devices are generally suitable for what may be regarded as ordinary performance, there is room for improvement in terms of ease of use and safety. More recent efforts to address these shortcomings have included employing a moveable carriage having a slicing blade and a hopper for holding a food item, wherein the carriage and slicing blade can be moved relative to the food item to slice the food item, rather than moving the food item across the slicing blade as has heretofore been common. Such existing devices, however, can be cumbersome to operate.

In view of the above, there is a need for a mandoline cutting apparatus that is easy to use, slices and/or juliennes food items in an efficient manner, and which includes a variety of safety features that maximize safe use thereof.

SUMMARY OF THE INVENTION

It is an object of the present invention to provide a mandoline cutting apparatus.

It is another object of the present invention to provide an upright mandoline cutting apparatus.

It is another object of the present invention to provide an upright mandoline cutting apparatus having a locking mechanism for a food-receiving chute.

It is another object of the present invention to provide an upright mandoline cutting apparatus having a locking mechanism for a moveable slicing carriage.

These and other objects are achieved by the present invention.

According to an embodiment of the invention, a mandoline cutting apparatus includes a frame, a carriage assembly having a slicing blade, the carriage assembly being slidably moveable relative to the frame to slice a food item with the slicing blade, a food chute pivotally connected to the frame and moveable between a closed position and an open position, and a locking mechanism for locking the food chute in a closed position.

According to another embodiment of the invention, a method of operating a mandoline cutting apparatus having a frame, a carriage assembly slidably moveable relative to the frame, and a food chute pivotally connected to the frame is provided. The method includes the steps of urging the carriage assembly downwardly relative to the frame, and rotating the food chute outwardly, away from the frame, to provide access to a slicing blade carried by the carriage.

According to yet another embodiment of the invention, a mandoline cutting apparatus includes a frame, a carriage assembly having a slicing blade, the carriage assembly being slidably moveable relative to the frame to slice a food item with the slicing blade, a food chute pivotally connected to the frame and moveable between a closed position and an open position, and a locking mechanism for simultaneously locking the food chute in a closed position and inhibiting sliding movement of the carriage assembly relative to the frame.

BRIEF DESCRIPTION OF THE DRAWINGS

The present invention will be better understood from reading the following description of non-limiting embodiments, with reference to the attached drawings, wherein below.

DETAILED DESCRIPTION OF THE PREFERRED EMBODIMENT

Referring generally to FIGS. 1-6, a mandoline cutting apparatus 10 (also referred to herein as a mandoline slicer) according to an embodiment of the invention is illustrated. The mandoline cutting apparatus 10 includes a frame 12, a carriage assembly 14 slidably mounted to the frame 12, and a feed or food chute 16 pivotally connected to the frame 12. In an embodiment, the frame 12 and the carriage assembly 14 are generally rectangular in shape, although other shapes and configurations are possible. In an embodiment, the mandoline cutting apparatus 10 includes a plurality of springs (not shown) or similar biasing mechanism that biases the carriage assembly 14 relative to the frame 12 to the position shown in FIG. 3. As discussed below, the carriage assembly 14 can be urged against the spring bias to the position shown in FIGS. 1 and 2 to slice a food item placed within the food chute 16. The presence of the springs, in combination with a force exerted by a user, allows the carriage assembly 14 to move back in forth in a reciprocating manner to slice food items.

Figure 1:
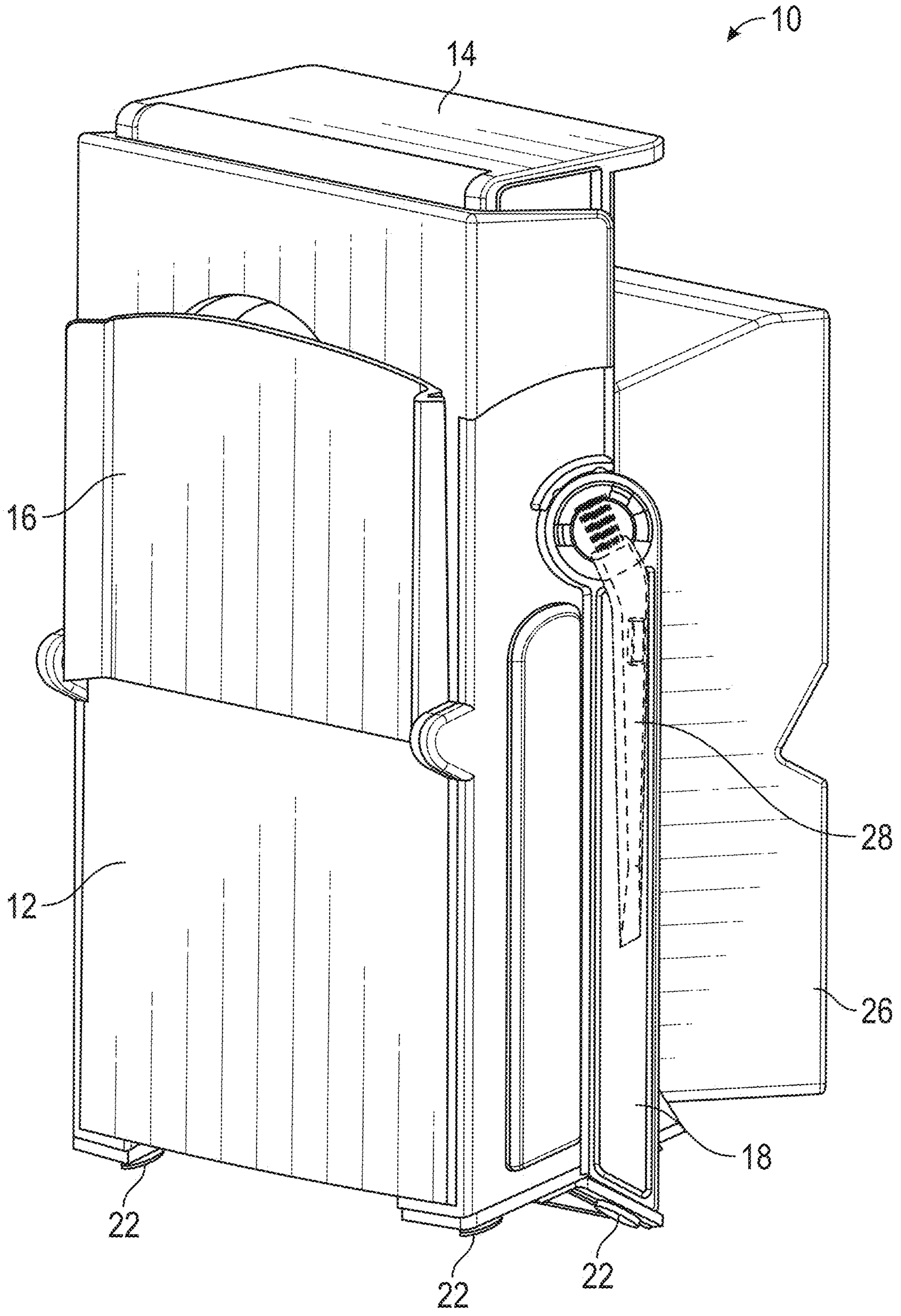
FIG. 1 is a perspective view of a mandoline cutting apparatus according to an embodiment of the present invention, showing a stowed position.
Figure 2:
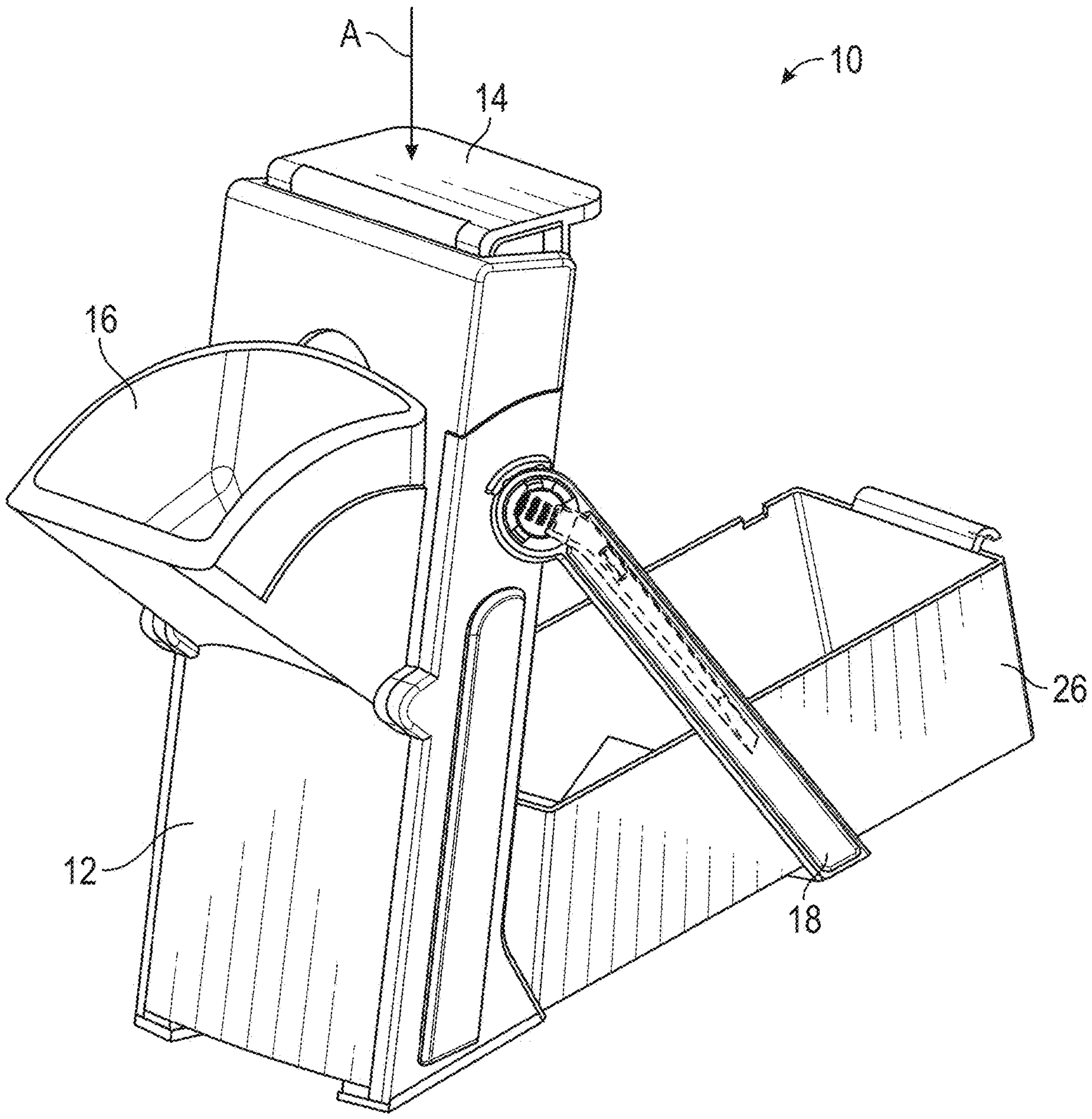
FIG. 2 is a perspective view of the mandoline cutting apparatus of FIG. 1, showing an operating position.
Figure 3:
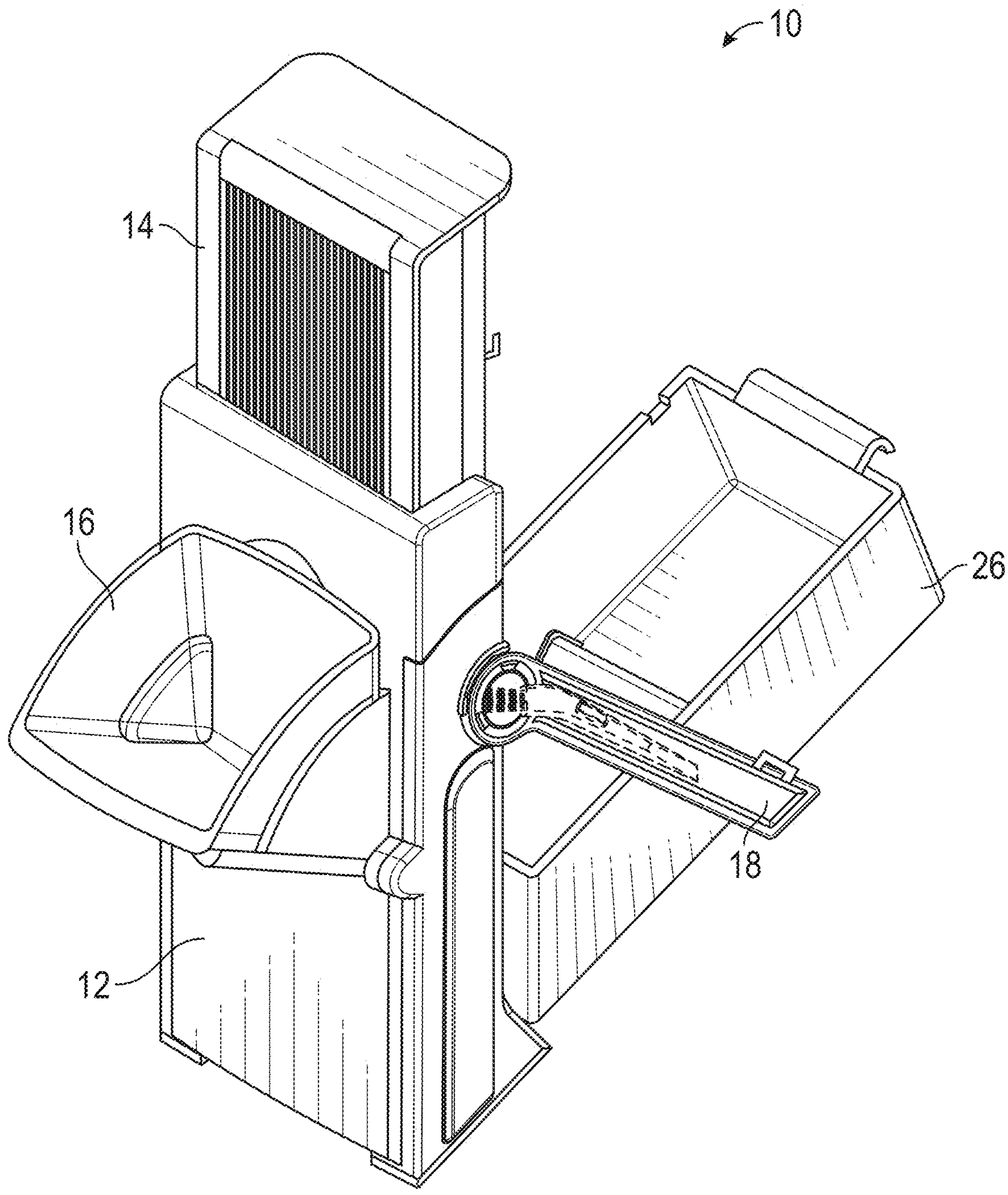
FIG. 3 is another perspective view of the mandoline cutting apparatus of FIG. 1, showing an operating position.

The mandoline cutting apparatus 10 also includes a pair of leg members 18, 20 pivotally connected to opposing sides of the frame 12. The leg members and/or the bottom of the frame 12 may include a plurality of feet 22 that aid to support the apparatus 10 on a surface and to inhibit sliding thereon. In an embodiment, the feet 22 may be rubber and/or be formed as suction cups. The leg members 18, 20 may be interconnected by a cross member 24 that functions to locate and maintain the position of a collection container 26 during operation, as disclosed hereinafter. As best shown in FIGS. 1-3, the mandoline cutting apparatus 10 thus includes the collection container 26, and may also include a brush 28 removably connected to one of the leg members 18, 20, and a food pusher (not shown). As shown in FIGS. 1 and 2, the leg member 18, 20 are rotatable between a stowed position (FIG. 1) and an extended or operational position (FIG. 2) where they support the frame 12 on an upright angle. In this operational position, the collection container 26 can be positioned behind/beneath the frame 12 and carriage, and held in position by the opposing leg members 18, 20, as shown in FIGS. 2 and 3, where it can collect sliced food items.

Figure 4:
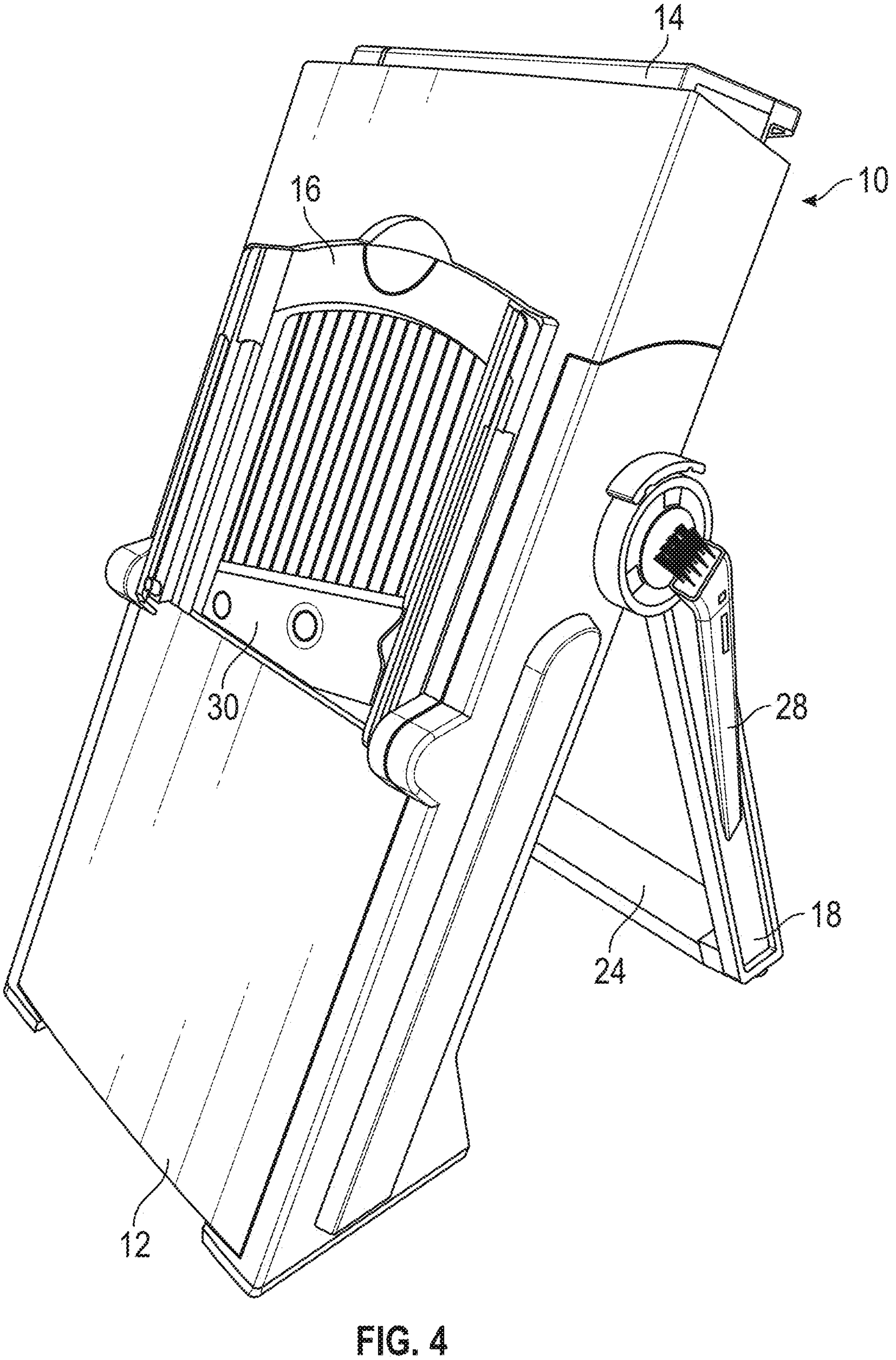
FIG. 4 is perspective, front view of the mandoline cutting apparatus of FIG. 1, showing a food chute in a closed position.
Figure 5:
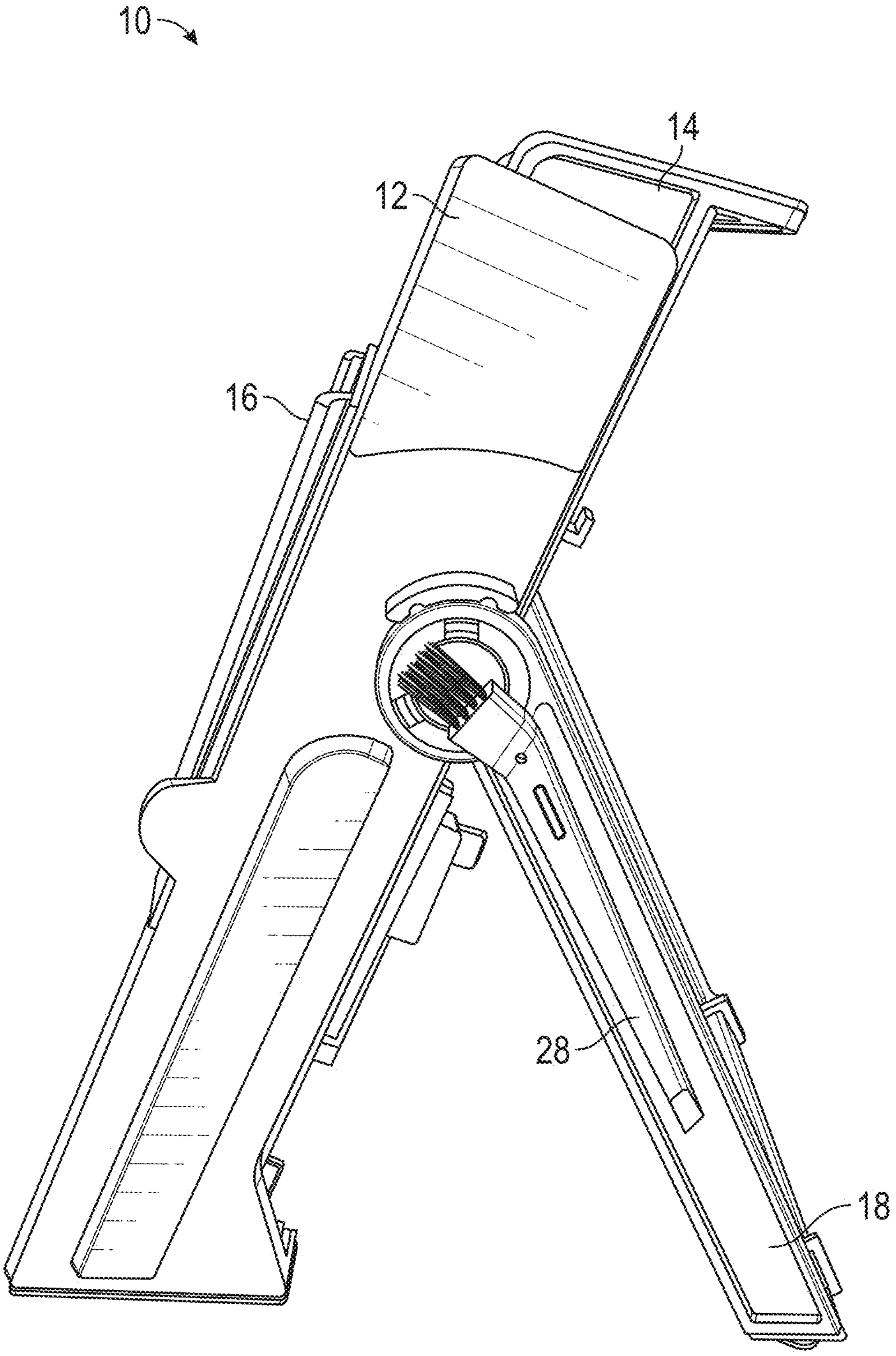
FIG. 5 is a perspective, side view of the mandoline cutting apparatus of FIG. 1, showing the food chute in the closed position.
Figure 6:
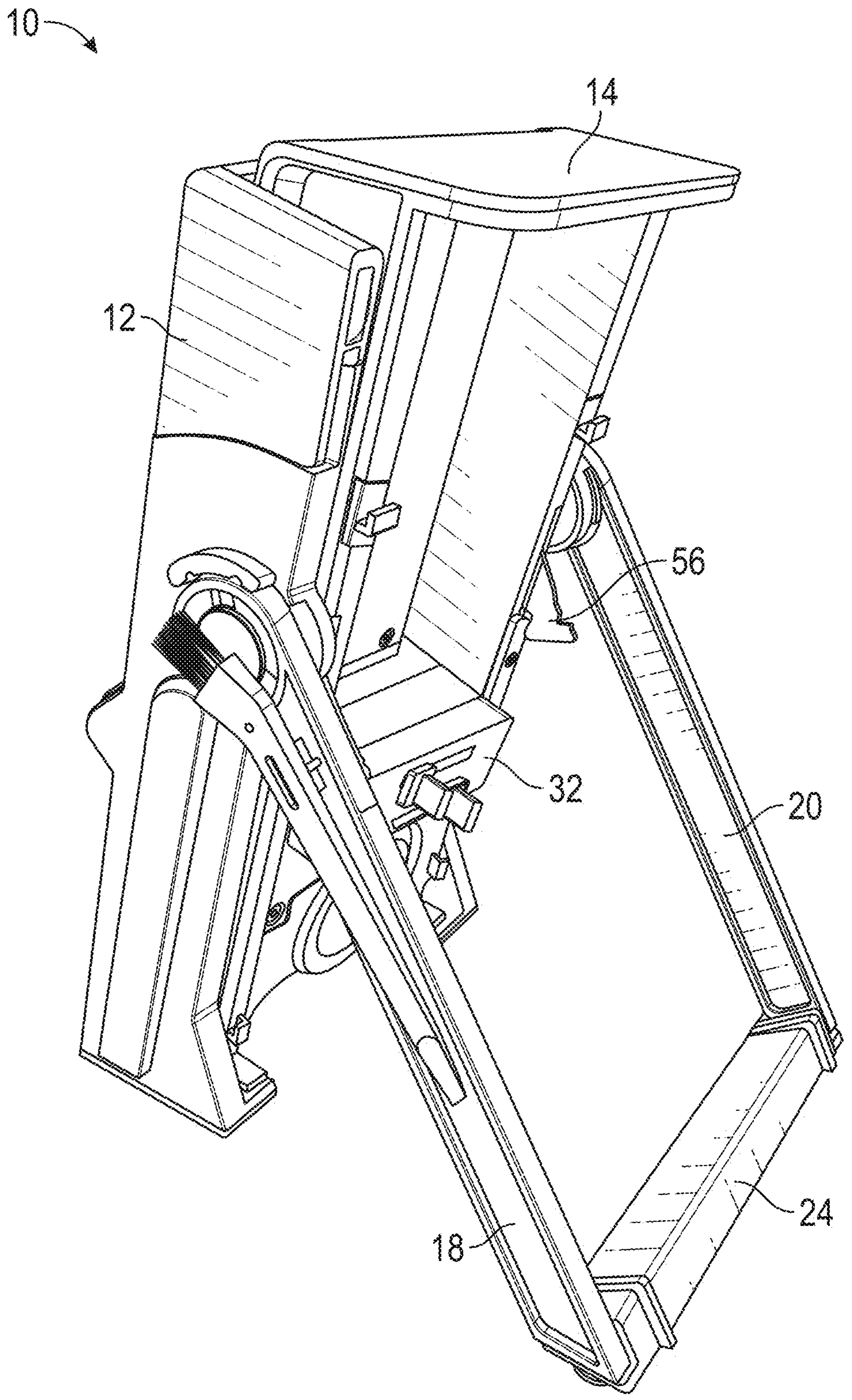
FIG. 6 is a perspective, rear view of the mandoline cutting apparatus of FIG. 1, showing the food chute in a closed position.
Figure 7:
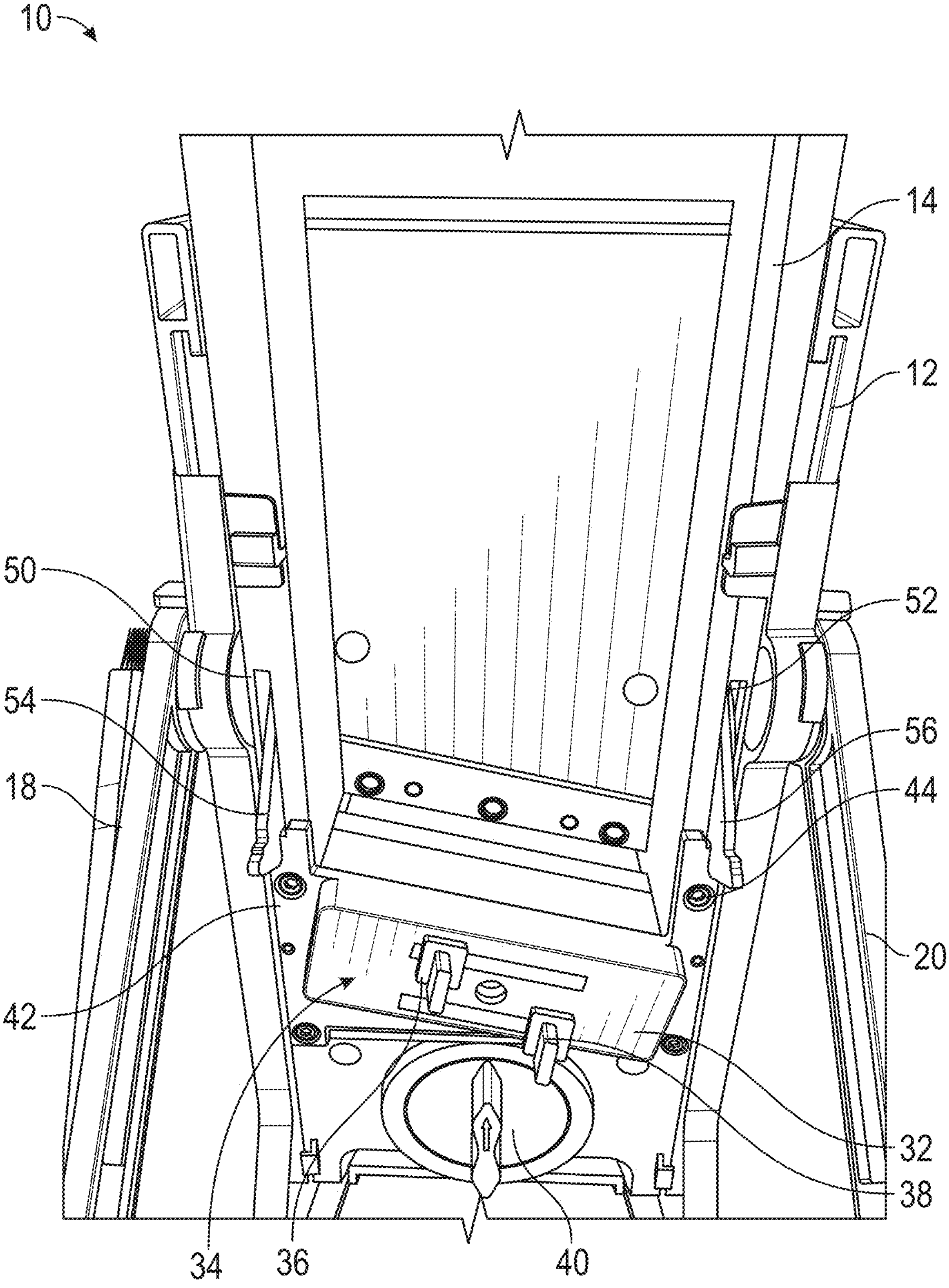
FIG. 7 is another perspective, rear view of the mandoline cutting apparatus of FIG. 1.
Figure 8:
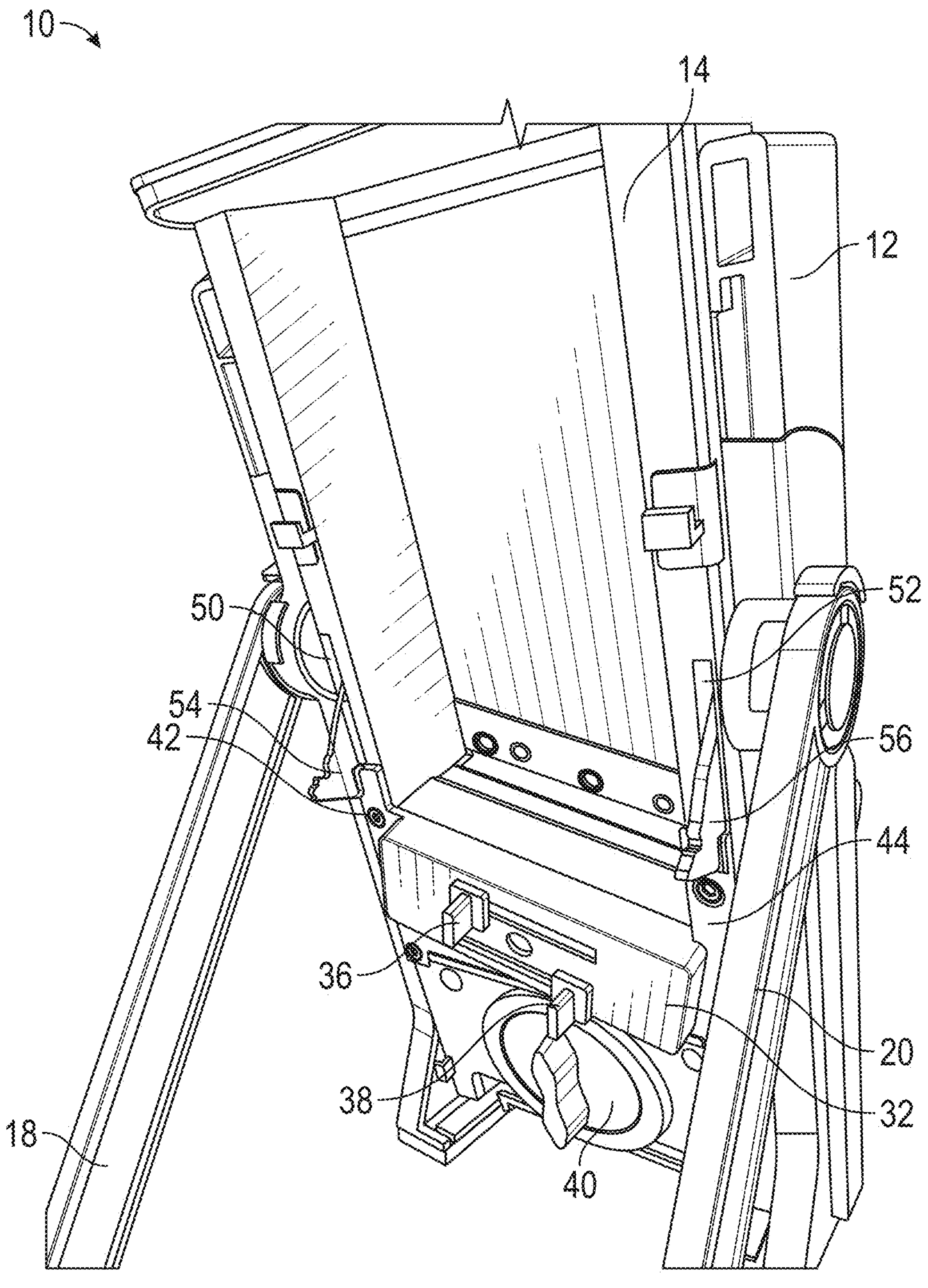
FIG. 8 is perspective, rear view of a portion of the mandoline cutting apparatus of FIG. 1.
Figure 9:
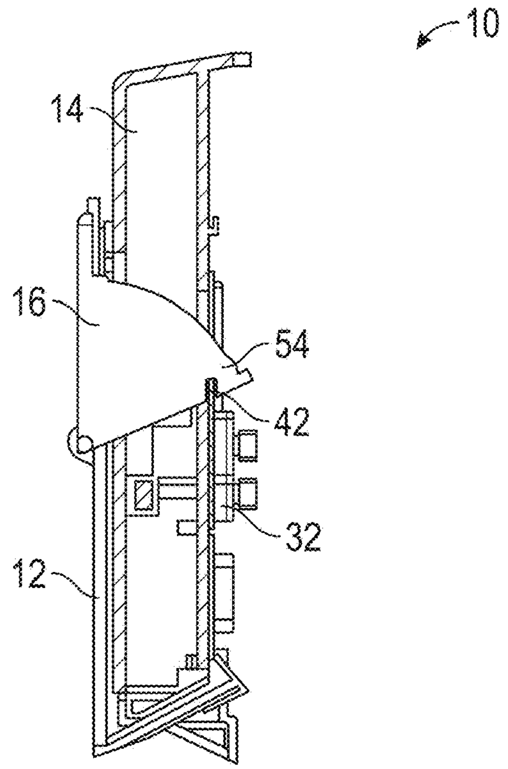
FIG. 9 is a side, cross-sectional view of the mandoline cutting apparatus of FIG. 1, showing the food chute in the closed position.
Figure 10:
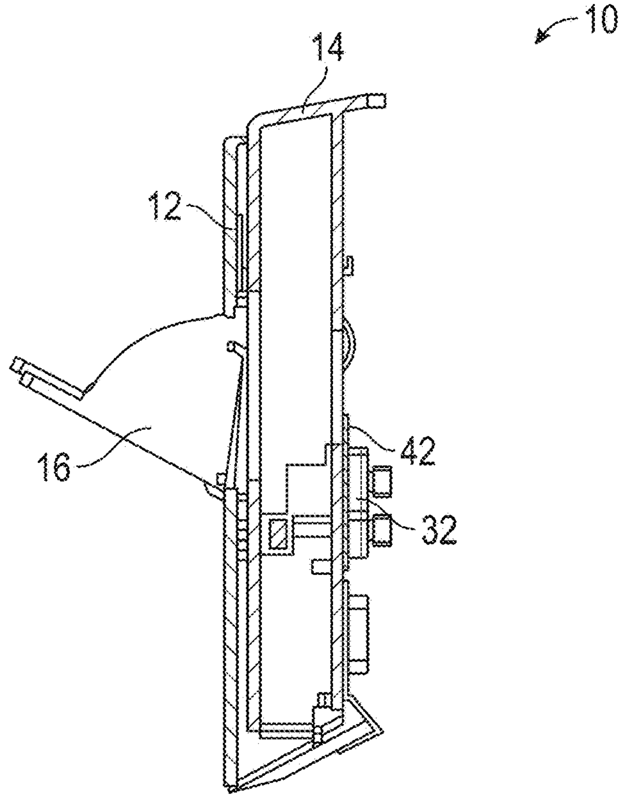
FIG. 10 is a side, cross-sectional view of the mandoline cutting apparatus of FIG. 1, showing the food chute in the open position.

As best shown in FIG. 4, the carriage assembly 14 includes a generally flat plate or surface having an opening within which a slicing blade 30 is mounted, as is known in the art. As best shown in FIGS. 7 and 8, the carriage assembly 14 also includes a julienne blade assembly 32. The julienne blade assembly 32 includes first and second arrays of julienne blades (not shown) that can be selectively deployed adjacent to the slicing blade 30 to slice food items. As best shown in FIG. 7, the julienne blade assembly 32 includes a control mechanism 34 having a pair of slider members 36, 38 for moving the first and second arrays of julienne blades, respectively, between extended and retracted positions (i.e., extending the blades closer to, or moving them away from, the opening in the carriage assembly 14). The carriage assembly 14 additionally includes a slice thickness adjustment mechanism 40 which may be, for example, a rotatable knob, that is operable to adjust the spacing between the slicing blade 30 and a lower portion of the flat plate of the carriage assembly 14. For example, in an embodiment, the knob 40 may be rotatable to move a lower portion of the flat plate of the carriage assembly 14 closer to, or away from, the slicing blade 30, to adjust the thickness of gap between the lower portion of the carriage assembly 14 and the slicing blade 30.

Figure 13:
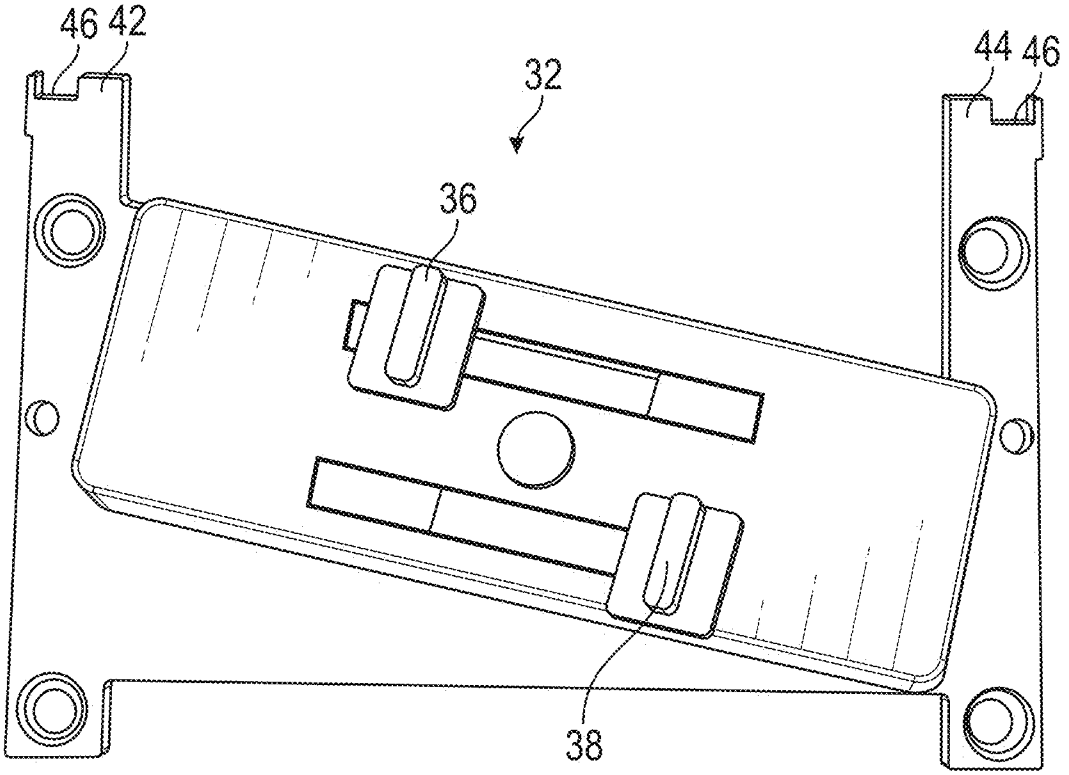
FIG. 13 is a perspective view of a julienne blade control mechanism of the carriage assembly of the mandoline cutting apparatus.

FIG. 13 shows a detailed view of a portion of a cover plate of the julienne blade assembly 32 of the carriage 14. As shown therein, the julienne blade assembly includes a pair of opposing arms 42, 44 (also referred to herein as engagement members) having notches 46, the purpose of which is disclosed hereinafter. While FIG. 13 shows the cover plate as being a separate component, in an embodiment, the cover plate, and the arms 42, 44 thereof may be integrally formed with the carriage assembly 14 (i.e., the carriage assembly 14, itself, may include the arm features.

Figure 11:
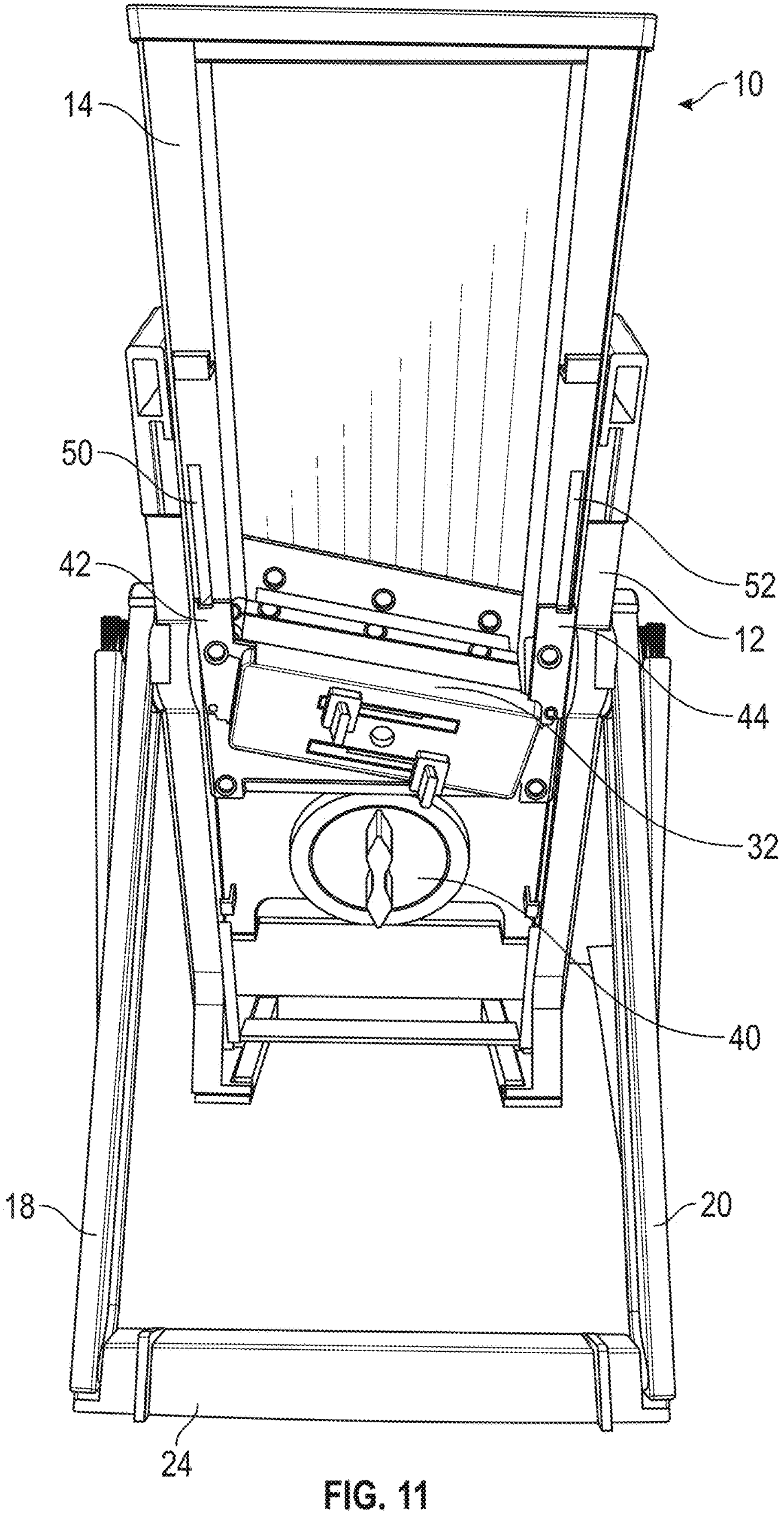
FIG. 11 is a perspective, rear view of the mandoline cutting apparatus of FIG. 1, showing the slicing carriage in an operational position.
Figure 12:
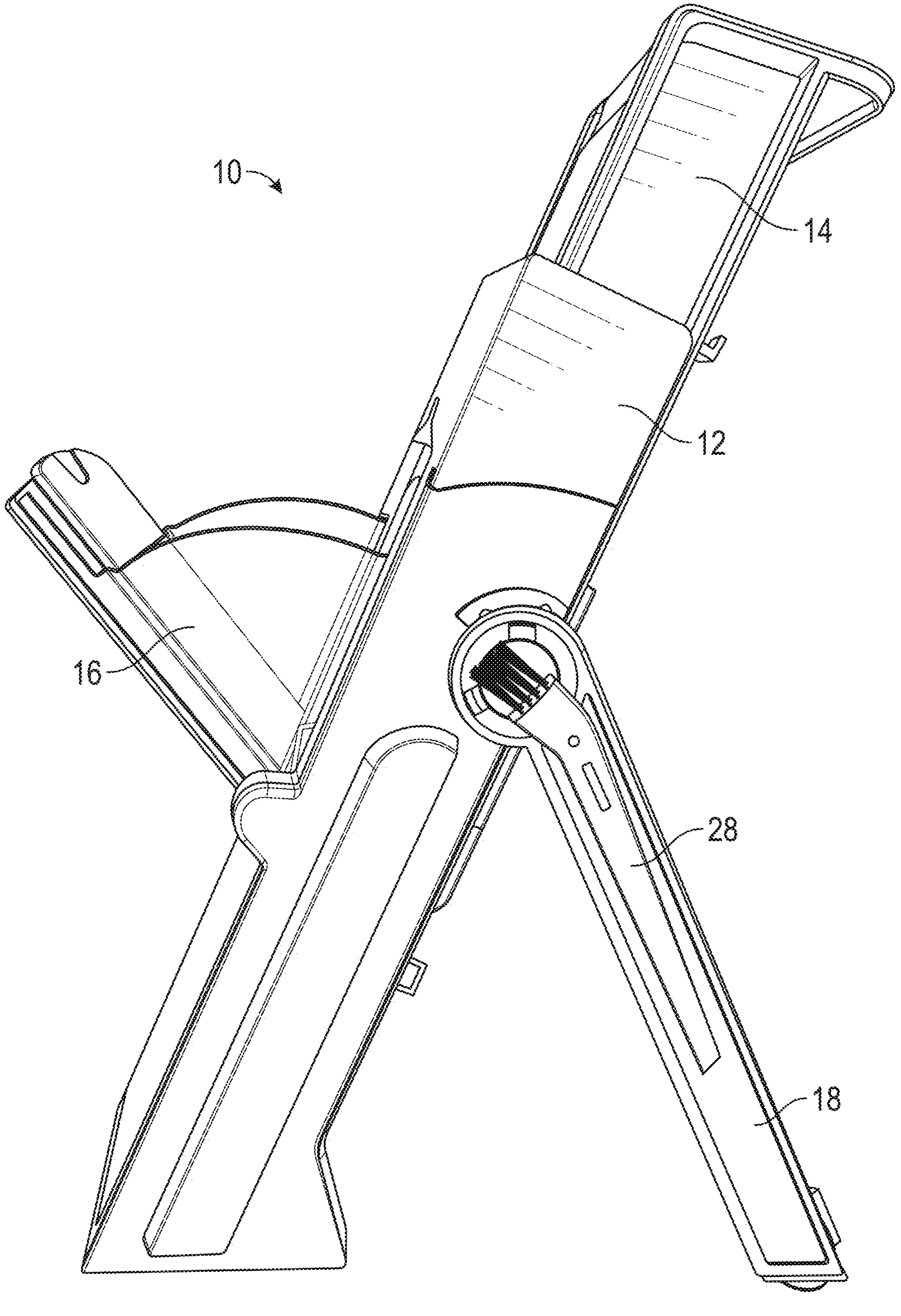
FIG. 12 is a perspective, side view of the mandoline cutting apparatus of FIG. 1 in an operational position.

As best shown in FIG. 11, the carriage assembly 14 includes a pair of opposed, vertically oriented clearance openings or slots 50, 52 that terminate just above the opposing arms 42, 44. As best shown in FIGS. 4 and 6-8, the slots 50, 52 are configured to receive opposing side members or side panels 54, 56 of the food chute 16 therethrough. Regarding the food chute 16, as perhaps best shown in FIG. 18, the food chute 16 includes the opposing side panels 54, 56, and a front panel 58. Each of the side panels 54, 56, includes a notch 60 adjacent to a distal end thereof, in a lower edge thereof, and a projection 62, the purposes of which will be described hereinafter. The food chute 16 also includes a pair of opposed pivot pins 64, via which the food chute 16 is pivotally mounted to the frame 12.

Figure 14:
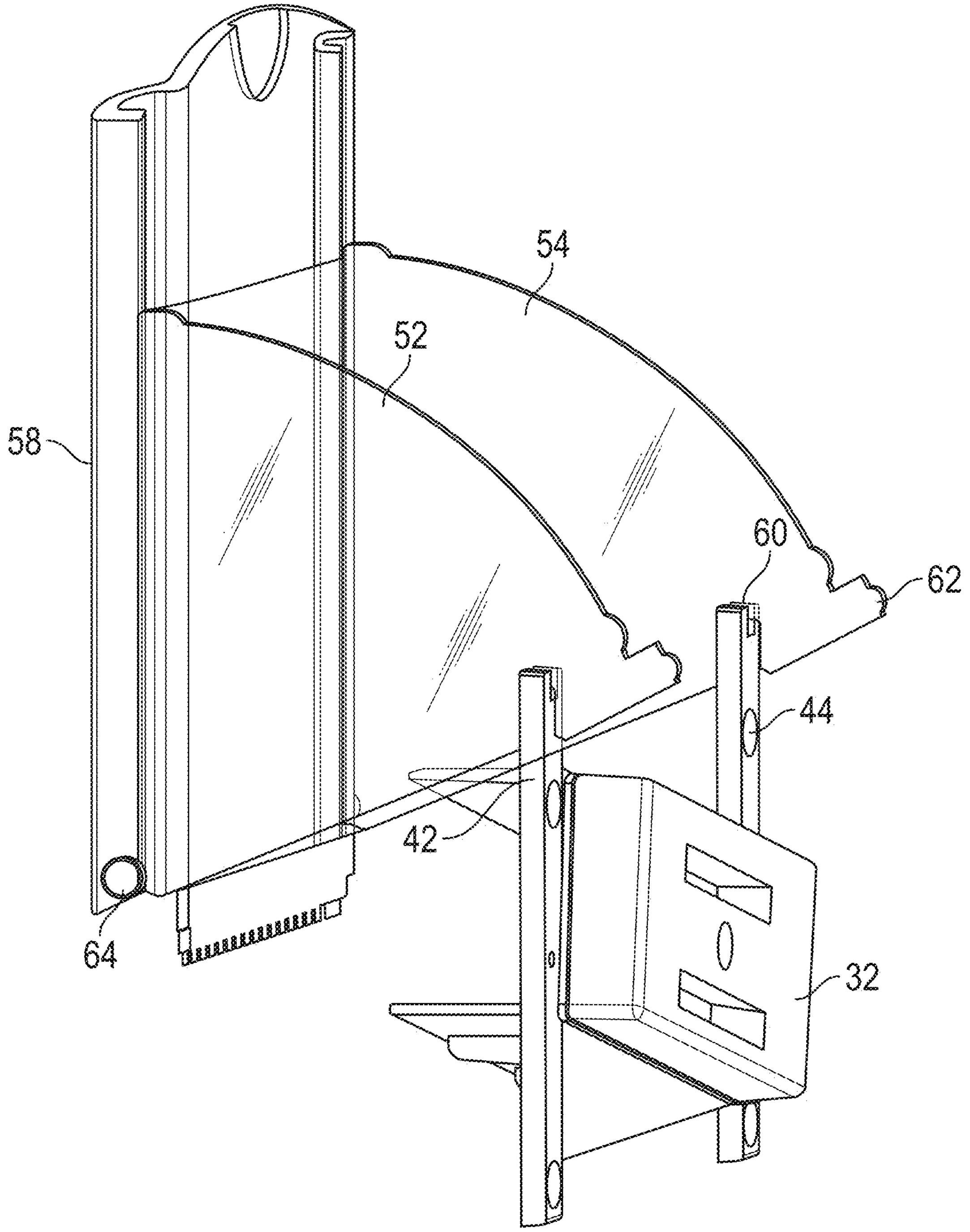
FIG. 14 is a simplified perspective view of a portion of the mandoline cutting apparatus, showing interaction of a locking mechanism of the mandoline cutting apparatus with the food chute during a locked position of the chute.
Figure 15:
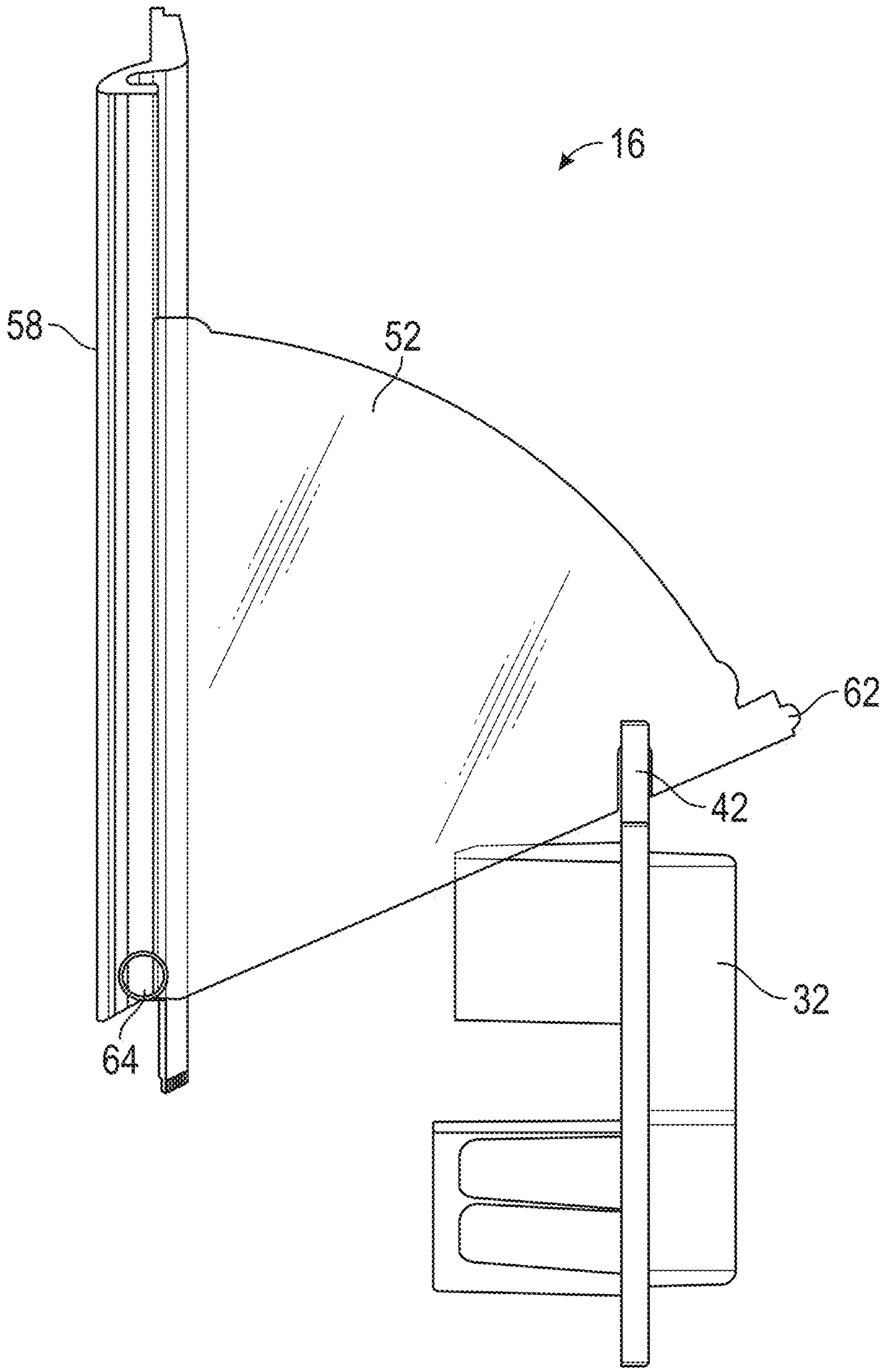
FIG. 15 is a simplified perspective view of a portion of the mandoline cutting apparatus, showing interaction of the locking mechanism with the food chute during the locked position of the chute.

With reference to FIGS. 6-9, when the carriage assembly 14 is in its compressed, lowered position, and when the food chute 16 is in the closed position where it is rotated into the frame 12 about pivot pins 64 such that the front panel 56 of the food chute 16 is parallel to the front face of the carriage assembly 14, the opposing side panels 54, 56 of the food chute 16 extend through the slots 50, 52 and project from the back side of the carriage assembly 14. In this position the upper ends of the arms/engagement members 42, 44 are received within the notches 60 in the opposing side panels 54, 56 of the food chute 16. This engagement of the arms 42, 44 in notches 60 is best illustrated in the simplified views FIGS. 14 and 15. In this position, the carriage assembly 14 cannot be moved upwardly (either manually or under the upward bias of the internal springs). In this respect, the mandoline cutting assembly 10 includes a redundant safety feature, namely, the slicing blade is not exposed to a user, as it is safely behind the closed food chute 16 (see FIG. 4), and the food chute 16 cannot be inadvertently opened as it is held in the closed position by engagement of the arms 42, 44 within the notches 60 in the side panels 54. Additionally, the carriage assembly 14 and slicing blade 30 thereof is prevented from movement relative to the frame 12 due to this same engagement of the arms/engagement members 42, 44 in notches 60 of the food chute 16, which prevents the carriage assembly 14 from moving upwardly relative to the frame 12. In this respect, both the food chute 16 and the carriage assembly 14 are in locked/static position, whereby pulling up on the carriage assembly 14 does not effect movement of the carriage assembly 14, and pulling outward on the food chute 16 does not effect opening of the food chute 16.

Figure 16:
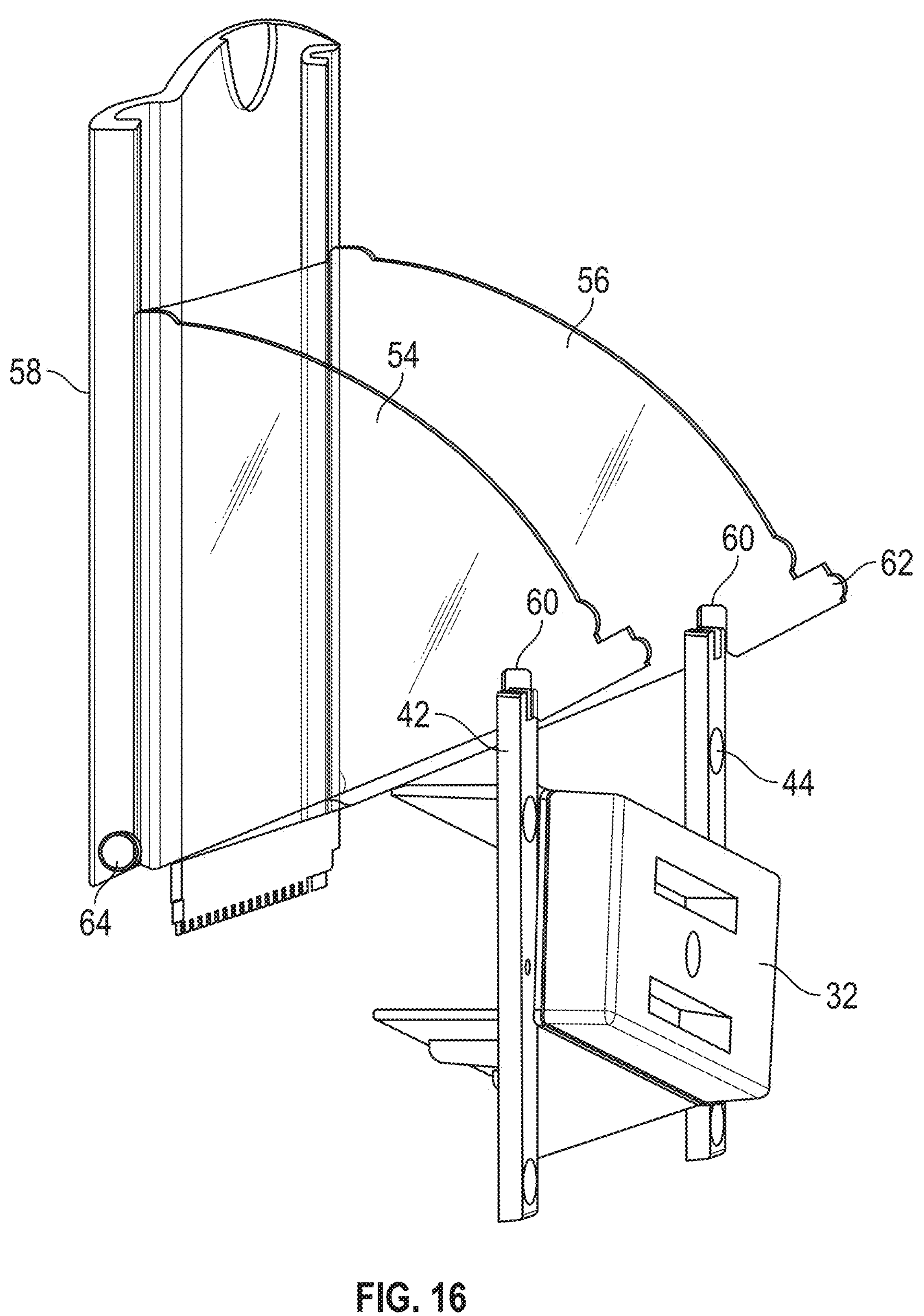
FIG. 16 is a simplified perspective view of a portion of the mandoline cutting apparatus, showing interaction of the locking mechanism with the food chute during an unlocked position of the chute.
Figure 17:
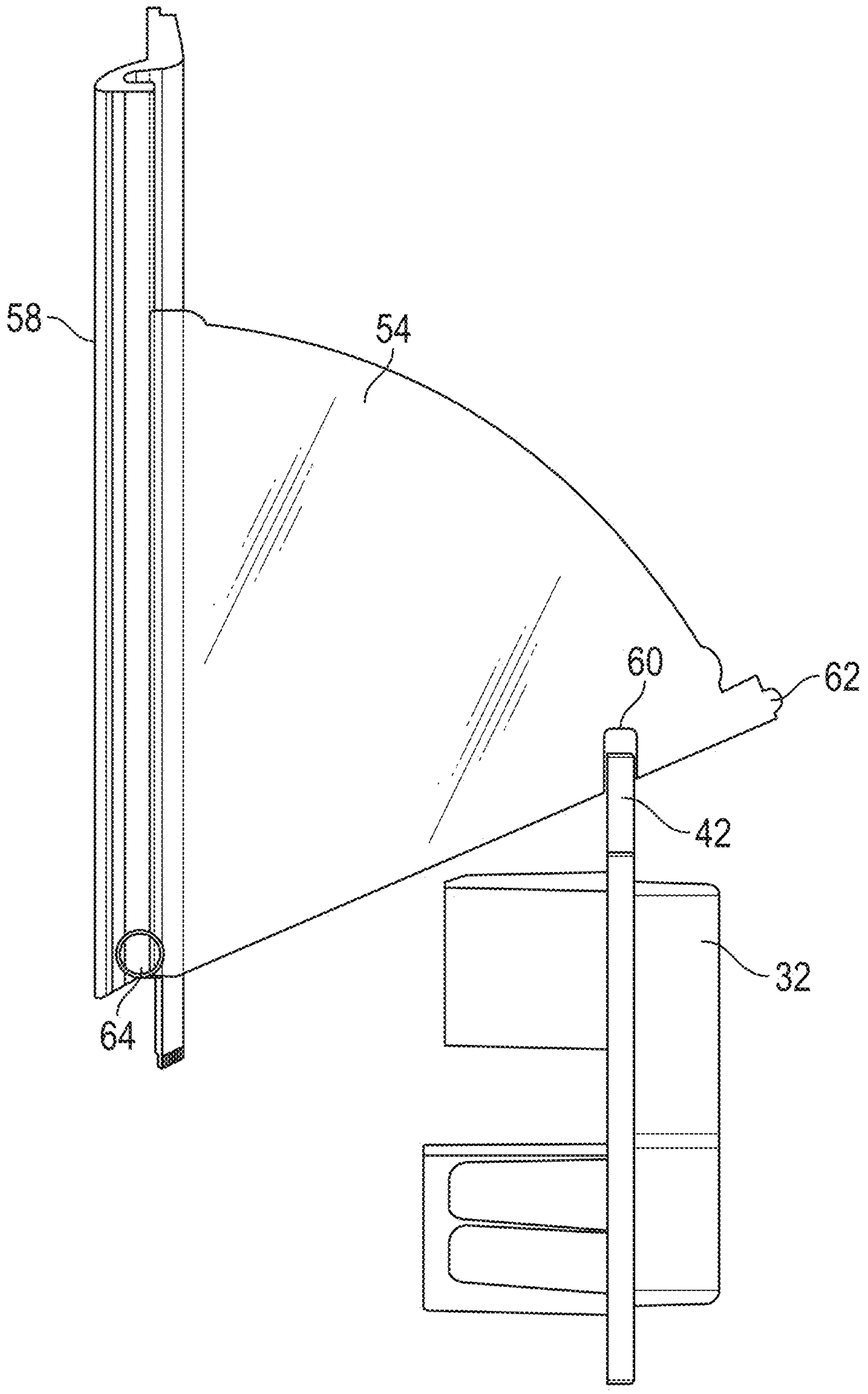
FIG. 17 is a simplified perspective view of a portion of the mandoline cutting apparatus, showing interaction of the locking mechanism with the food chute during the unlocked position of the chute.

When it is desired to utilize the mandoline cutting assembly 10, however, a user can push downwardly on the top of the carriage assembly 14, as indicated by arrow, A, in FIG. 2. With reference to FIGS. 16 and 17, this force causes the carriage assembly 14 and julienne blade assembly 32 (and arms/engagement members 42, 44 thereof) to move downwardly relative to the frame 12 and food chute 16. This slight downward movement causes the arms/engagement members 42, 44 to move slightly downward within the notches 60 (e.g., only about 2 millimeters) in the opposing side panels 54, 56 of the food chute 16, providing enough clearance for the food chute 16 to be rotated outwardly about pivot pins 64 to the open position shown in FIGS. 2, 3, 10, 17 and 18. That is, as the carriage 14 is urged slightly downward, the arms/engagement members 42, 44 disengage from the fully seated position within the notches 60, allowing the food chute 16 to be rotated outward to the open position.

In this position, a food item can be placed within the feed chute 16 and held in place by the food pusher (not shown). The carriage assembly 14 can then be pushed downwardly by a user, causing the slicing blade 30 to slice through the food item within the food chute 16. The slice is then passes through the carriage assembly 14 as known in the art, and is collected in collection container 26. After being pushed downwardly, the internal springs bias the carriage assembly 14 upwardly to its starting position, shown in FIG. 3. In this respect, the downward force by a user, and the upward force of the biasing springs, allow the carriage assembly to be reciprocated back and forth relative to the frame 12 and food item to slice the food item in an efficient manner.

Figure 18:
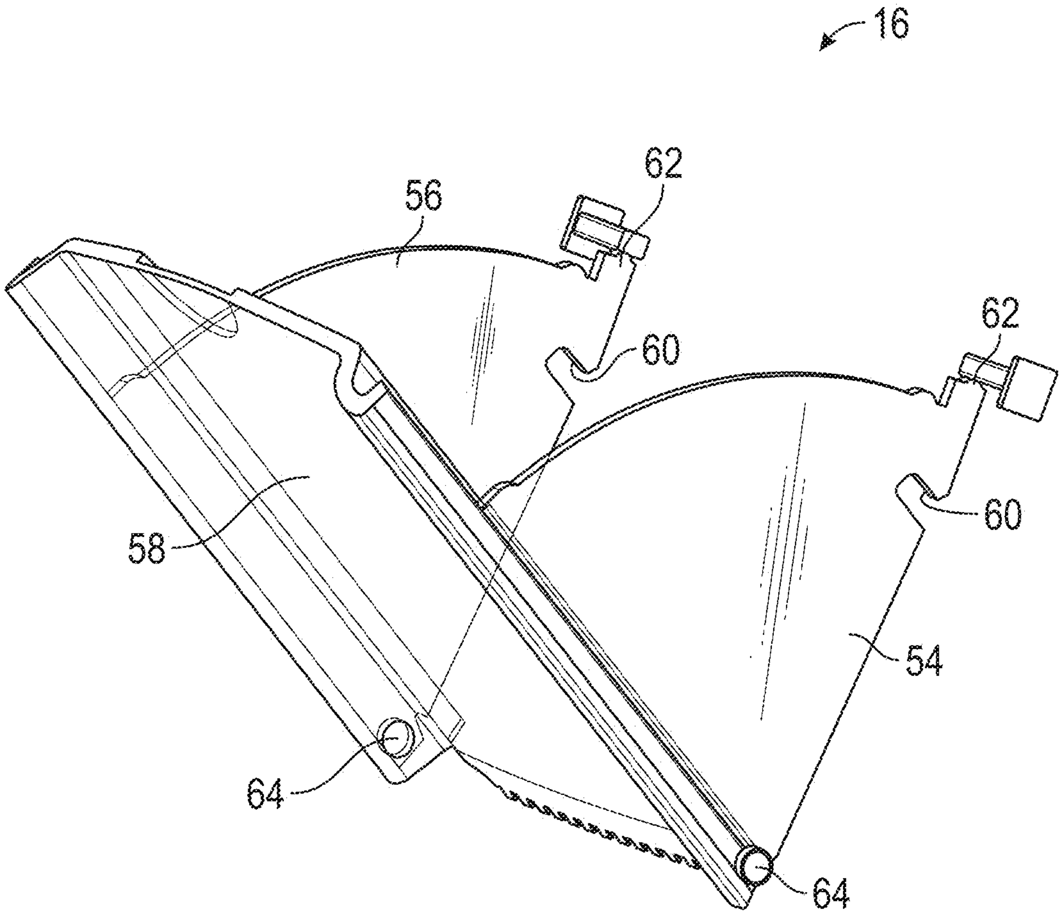
FIG. 18 is a simplified perspective view of a portion of the mandoline cutting apparatus, showing the open position of the chute.
Figure 19:
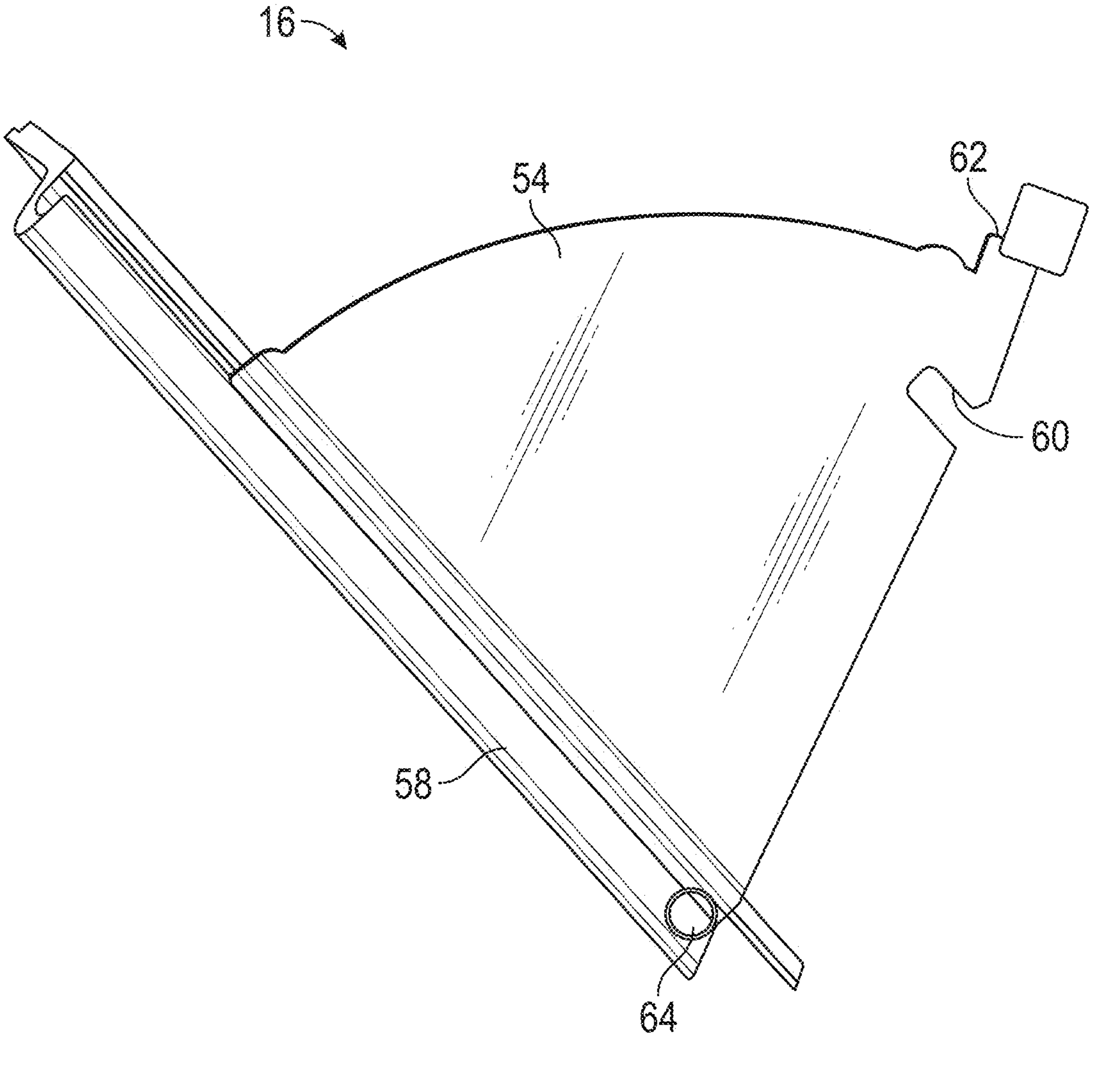
FIG. 19 is a simplified perspective view of a portion of the mandoline cutting apparatus, showing the open position of the chute.

Importantly, in the open position shown in FIGS. 18 and 19, the distal ends 62 of the side panels 54, 56 of the food chute 16 engage rails of the carriage assembly 14, maintaining the food chute 16 in the open position and preventing inadvertent closure. In an embodiment, the projections 62 of the side panels 54, 56 may be received in a recess or detent formed in the carriage assembly 14, as shown in FIGS. 17 and 18. When it is desired to close the feed chute 16, the carriage assembly 14 is moved to its downward position against the spring bias. In this position, the distal ends 62 of the food chute 16 are aligned with the slots 50, 52 in the carriage assembly 14. The food chute 16 can then be rotated inward about pivot pins 64. The opposing side panels 54, 56 of the food chute 26 pass through the slots 50, 52 until the upper ends of the arms 42, 44 are received within the notches 60 in the food chute 16, locking both the food chute 16 and carriage assembly 14 in the stowed position, as described above.

The mandoline cutting apparatus 10 of the invention thus provides an efficient and safe device for the slicing and julienne cutting of various food items. The upright design of the apparatus 10 provides an ergonomic design that is easy to use, and which folds down compactly for easy storage, as shown in FIG. 1. The spring-loaded carriage assembly requires only downward urging to slice food items, and provides for automatic return to the start position, which requires less effort than traditional mandoline slicing devices. Moreover, as disclosed above, the built-in locking mechanism provides a redundant safety feature that locks the food chute in the closed position, which blocks access to the slicing blade, as well as locks the carriage assembly in the stowed position, preventing movement of the carriage assembly and blades.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A mandoline cutting apparatus, comprising:
- a frame;
- a carriage assembly having a slicing blade, the carriage assembly being slidably moveable relative to the frame to slice a food item with the slicing blade;
- a food chute pivotally connected to the frame and moveable between a closed position and an open position; and
- a locking mechanism for simultaneously locking the food chute in the closed position and inhibiting sliding movement of the carriage assembly relative to the frame.

2. The mandoline cutting apparatus of claim 1, further comprising:
- a slice thickness adjustment mechanism for setting a thickness of slices produced by the mandoline cutting apparatus.

3. The mandoline cutting apparatus of claim 1, wherein:
- the food chute includes a pair of opposed side panels, at least one of the side panels including one of a notch and an engagement member for engaging the other of a notch and an engagement member of the carriage assembly, the notch and the engagement member being components of the locking mechanism.

4. The mandoline cutting apparatus of claim 1, wherein:
- the food chute includes a pair of opposed side panels, at least one of the side panels including a notch; and
- the carriage assembly includes an engagement member configured to be received in the notch to maintain the food chute in the closed position;
- wherein the notch and the engagement member are components of the locking mechanism.

5. The mandoline cutting apparatus of claim 4, wherein:
- the carriage assembly includes a pair of opposed clearance slots that receive the opposed side panels of the food chute when the food chute is in the closed position.

6. The mandoline cutting apparatus of claim 5, wherein:
- the engagement member is located beneath one of the clearance slots.

7. The mandoline cutting apparatus of claim 1, wherein:
- the carriage assembly is moveable between an extended position relative to the frame, and a nested positioned relative to the frame.

8. The mandoline cutting apparatus of claim 1, wherein:
- in the closed position, the food chute obstructs access to the slicing blade.

9. The mandoline cutting apparatus of claim 1, further comprising:
- a julienne blade assembly adjacent to the slicing blade.

10. The mandoline cutting apparatus of claim 1, further comprising:
- a pair of opposed leg members pivotally connected to the frame, the opposed leg members being moveable between a storage position and an operational position;
- wherein in the operational position, the frame and the carriage assembly are oriented at an upright angle.

11. A mandoline cutting apparatus, comprising:
- a frame;
- at least one leg for supporting the frame in an angled orientation relative to a planar support surface;
- a carriage assembly having a slicing blade, the carriage assembly being slidably moveable relative to the frame to slice a food item with the slicing blade;

a food chute pivotally connected to the frame and moveable between a closed position and an open position; and a locking mechanism for simultaneously locking the food chute in the closed position and inhibiting sliding movement of the carriage assembly relative to the frame.

12. A mandoline cutting apparatus, comprising:

a frame;

at least one leg for supporting the frame in an angled orientation relative to a planar support surface;

a carriage assembly having a slicing blade, the carriage assembly being slidably moveable relative to the frame to slice a food item with the slicing blade;

a food chute pivotally connected to the frame and moveable between a closed position and an open position; and a locking mechanism for locking the food chute in the closed position, wherein the food chute includes a pair of opposed side panels, at least one of the side panels including a notch; and the carriage assembly includes an engagement member configured to be received in the notch to maintain the food chute in the closed position; and wherein the notch and the engagement member are components of the locking mechanism.

13. The mandoline cutting apparatus of claim 12, wherein:

the carriage assembly is configured so as to inhibit closing of the food chute when the carriage assembly is an extended position relative to the frame.

* * * * *